Figure 1:
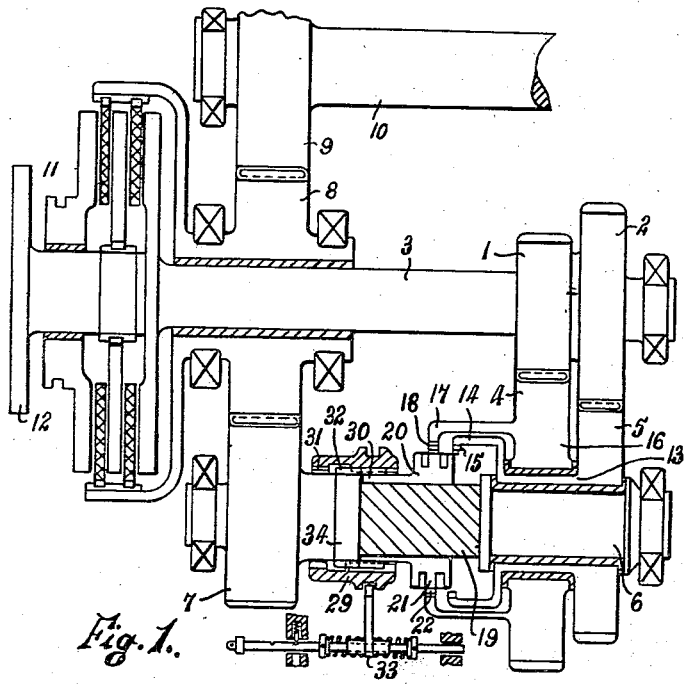

Sept. 4, 1956  P. J. SHORT  2,761,325
SYNCHRONIZING RATIO-SELECTING COUPLINGS
OF CHANGE-SPEED GEARING
Filed Feb. 15, 1951  5 Sheets-Sheet 1

INVENTOR
Philip John Short
BY
ATTORNEYS

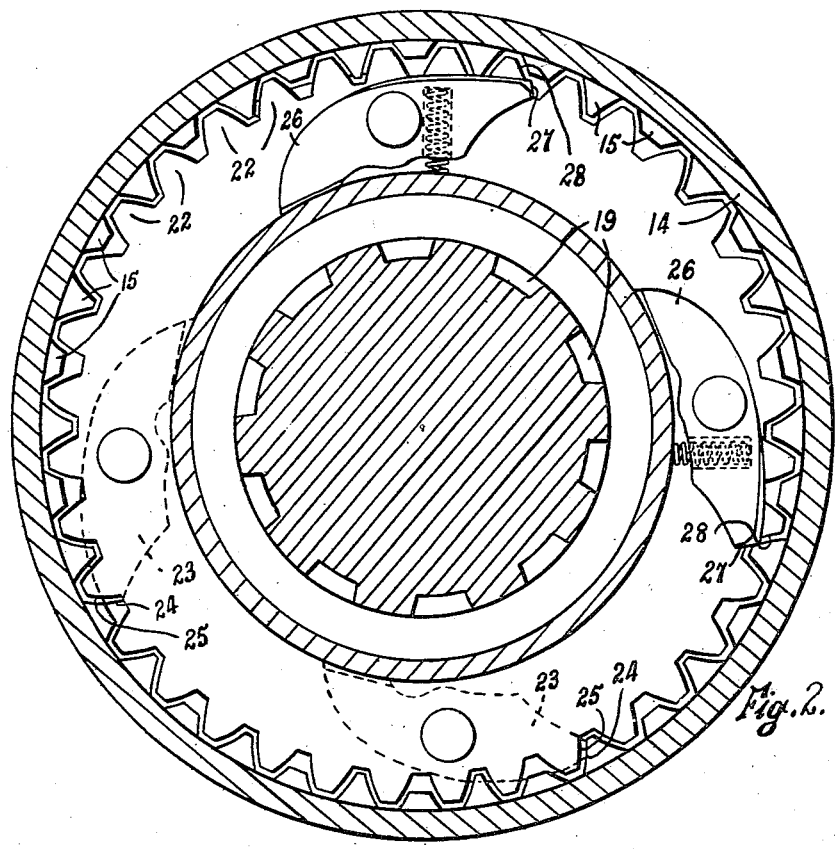

INVENTOR
Philip John Short
BY
ATTORNEYS

United States Patent Office 2,761,325
Patented Sept. 4, 1956

2,761,325

SYNCHRONIZING RATIO-SELECTING COUPLINGS OF CHANGE-SPEED GEARING

Philip John Short, Richmond, England, assignor to S. S. S. Gears Limited, Isleworth, England, a British company Application February 15, 1951, Serial No. 211,010

Claims priority, application Great Britain February 17, 1950

10 Claims. (Cl. 74—339)

This invention relates to mechanical coupling means of the synchronising coupling type for conveying rotation between or preventing rotation of parts of change-speed gearing and thereby establishing a particular speed ratio in the gearing.

The type of coupling means with which this invention is concerned, and examples of which are described in British Patent No. 410,083 and United States Patent No. 2,245,017, June 10, 1941, includes a toothed first member (which may be the driving member or a driven member or a stop member), a second member (which may be the driven or stop member, or the driving member respectively), an intermediate member so engaged with the second member as to be constrained to move helically with respect thereto in consequence of relative rotation between the intermediate and second members, the intermediate member having teeth engageable with the teeth on the first member, and a subsidiary ratchet drive adapted to couple together the first and intermediate members and so arranged as to effect engagement of the teeth of the first and intermediate members without clashing on relative angular displacement of the first and second members in one sense. In the preferred construction the subsidiary ratchet drive includes one or more pawls mounted on the intermediate member or on the first member and co-operating with teeth—preferably the said teeth—on the first or the intermediate member respectively.

In the normal operation of such synchronising coupling means, the torque load transmitted by the subsidiary ratchet drive is no more than that required to displace the intermediate member on the second member, since the arrangement is such that, during engagement together of the teeth on the first and intermediate members, the ratchet drive becomes inoperative before these teeth are fully engaged.

Such synchronising couplings are used at ratio selecting means in change-speed gearing embodying at least two of the above described toothed first members which are alternatively engageable by a common intermediate toothed member on a second member. In another arrangement each of the toothed first members is engageable by an intermediate toothed member on a second member (which in some cases is common to the two or more intermediate toothed members) the said intermediate toothed members in this case being linked for movement axially together and the arrangement being such that either one pair or the other pair of mating members is engageable alternatively. For convenience of description the expression "a common intermediate toothed member" is to be understood as including two or more intermediate toothed members linked for movement axially together and engageable alternatively with the respective first toothed members.

In such gearing involuntary reversal of the normal sense of rotation of the said toothed first members, which are themselves geared together to rotate at different speed ratios (such as may be caused in one or other arrangements of the gearing by reversal of the rotation of the input or the output shaft), can cause an unduly high torque to be applied to the subsidiary ratchet drives, and an object of the present invention is to provide an improved construction which for practical purposes eliminates the risk of damage due to excessive torque on the subsidiary ratchet drive.

According to the invention in one aspect, in synchronising coupling means of the type hereinbefore set forth and having at least two toothed first members alternatively engageable by a common intermediate toothed member, teeth on one of the said toothed first members and constituting a part of the subsidiary ratchet drive, are connected to the remainder of the said one of the toothed first members by a torsionally resilient coupling device.

According to the invention in another aspect, in synchronising coupling means of the type hereinbefore set forth and having at least two toothed first members alternatively engageable by a common intermediate toothed member, driving or driven teeth on one of the said toothed first members and also constituting a part of the subsidiary ratchet drive, are connected to the remainder of the said one of the toothed first members by a torsionally resilient coupling device which has a resilient action under torque in one sense and is positive under torque in the opposite sense.

In accordance with the invention in still another aspect, in change-speed gearing including means providing between a driving member and a driven member two power paths of different forward ratios using a common toothed intermediate member alternatively engageable for establishing either one of the two different forward-speed ratios between said driving and driven members, said means include a torsionally resilient coupling device which has a resilient action under torque in the non-driving sense and is positive under torque in the driving sense. The torsionally resilient coupling device is preferably included in the power path of the ratio yielding the higher speed.

The invention is illustrated by way of example in the accompanying drawings in which—

Figure 3:
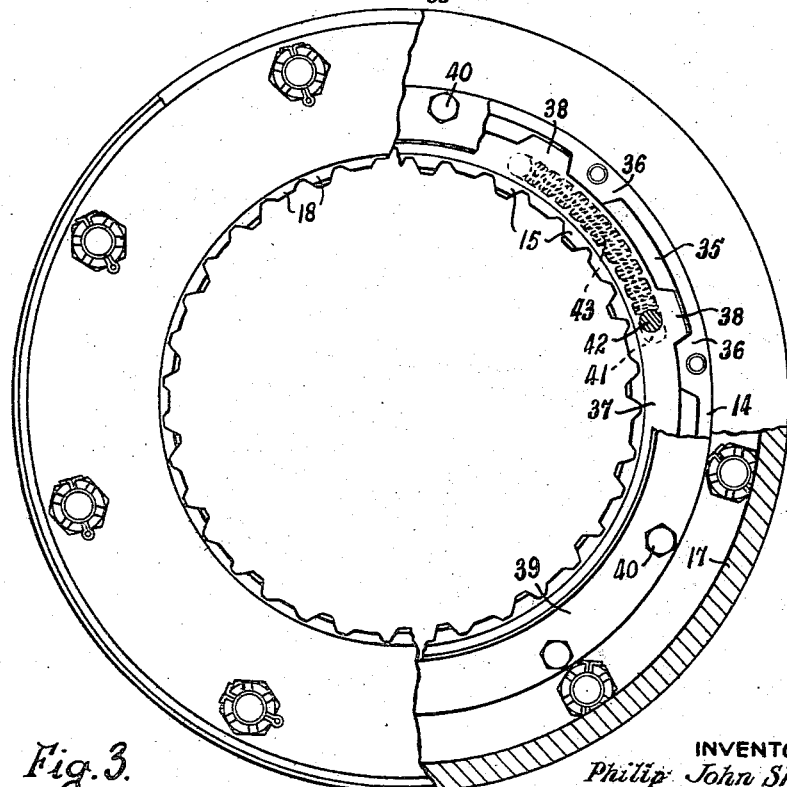
Figure 4:
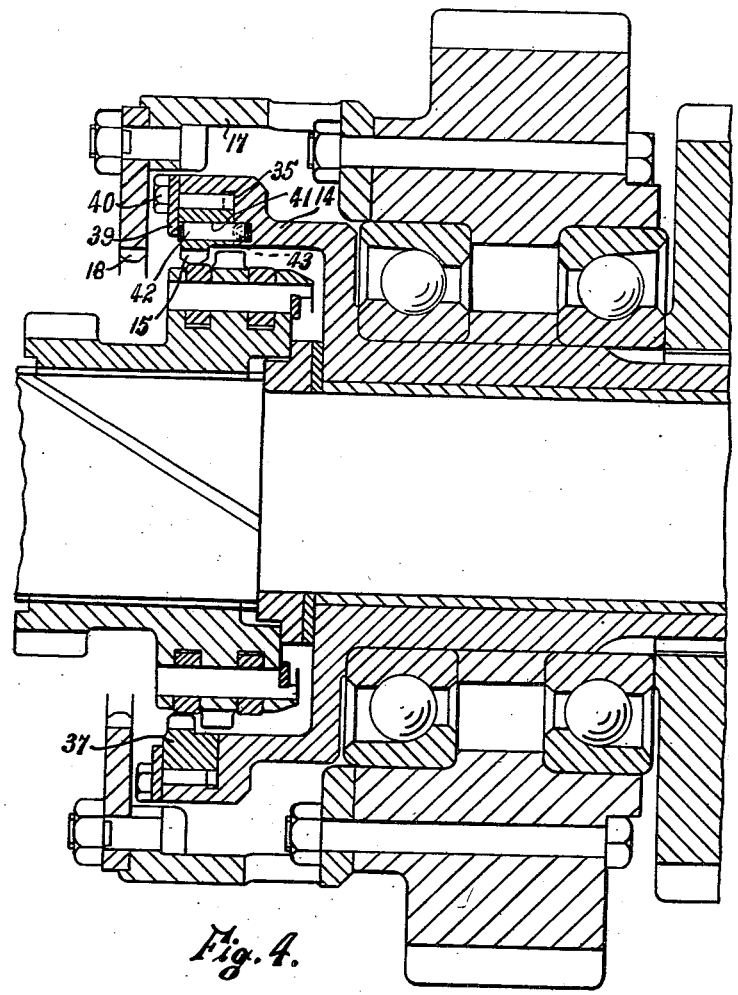
Figure 5:
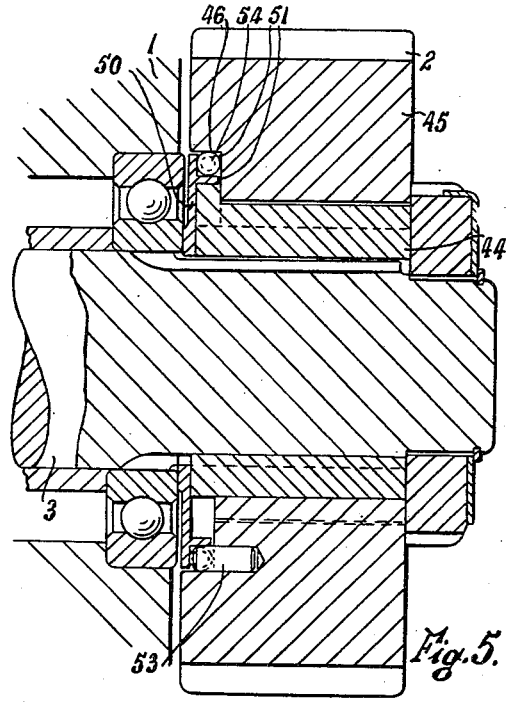
Figure 6:
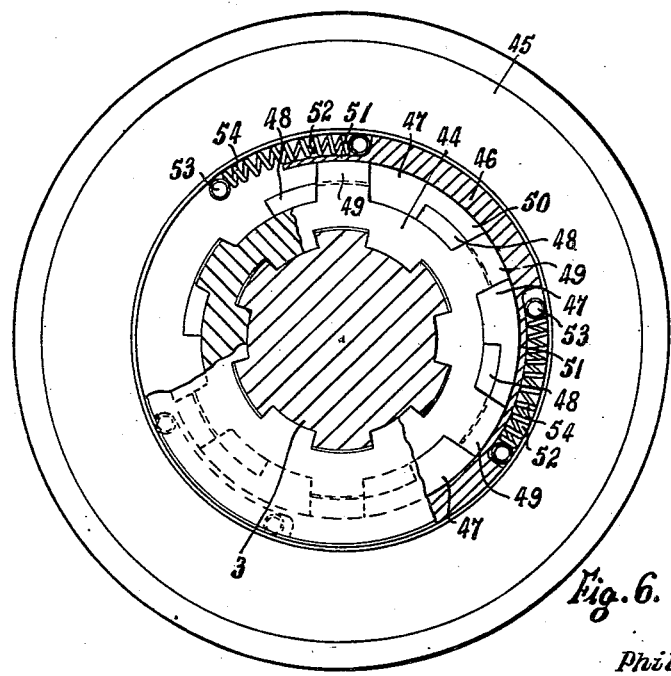
Figure 7:
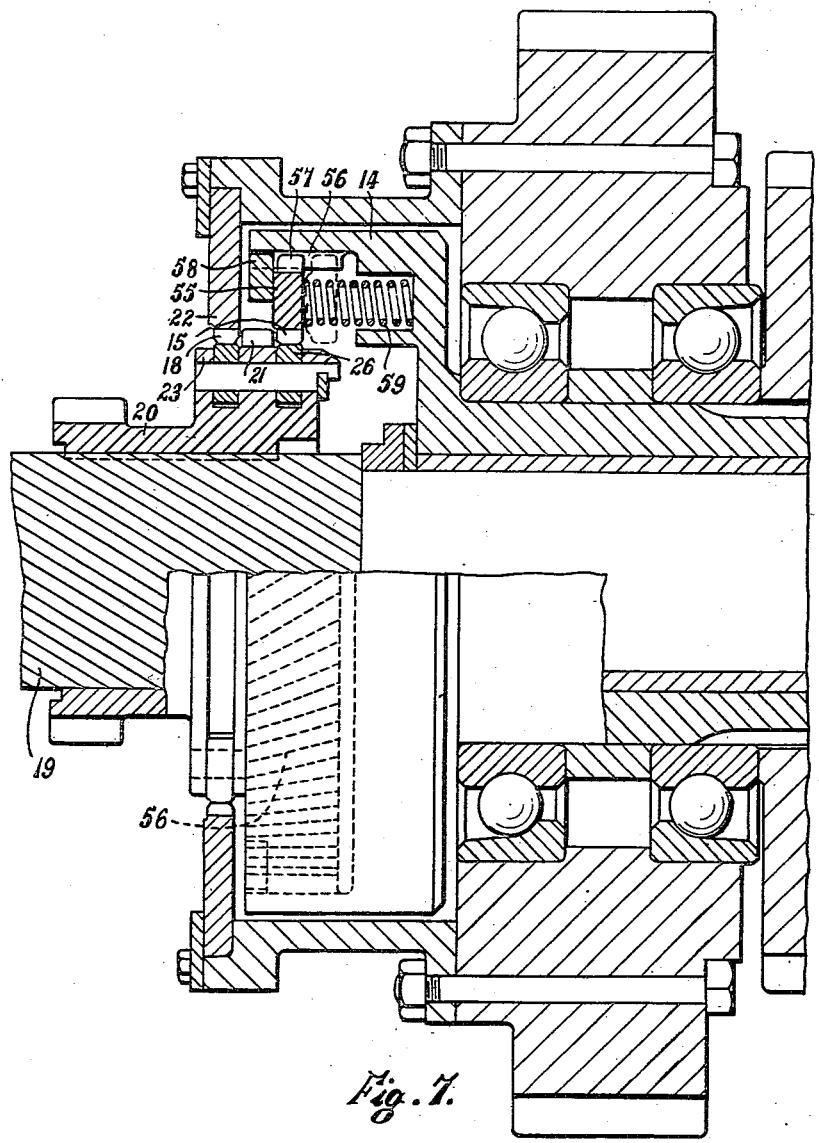

Figure 1 is a diagrammatic representation of one form of change-speed gear with which the invention may be used, Figure 2 is a view in sectional end elevation showing the intermediate member, a part of one of the first members and the second member, and looking from the right-hand end of the gear box shown in Figure 1, Figure 3 is a view in end elevation partly in section showing the torsionally resilient coupling device embodied in one of the first toothed members, Figure 4 is a view in sectional side elevation showing the intermediate member in the position with one set of pawls engaged with one of two alternative first toothed members, the engaged toothed member embodying the form of torsional coupling shown in Figure 3, Figures 5 and 6 show an alternative arrangement in which the torsionally resilient coupling is arranged between the input shaft and the second-speed pinion of a gear box as shown in Figure 1, Figure 5 being a sectional side elevation and Figure 6 being an end view partly in section taken from the left hand end of the pinion in Figure 5, Figure 7 is a sectional side elevation of a further alternative construction.

Referring to the drawings, Figure 1 is a diagrammatic illustration of a gearing providing three forward speeds and arranged as follows. First- and second-speed pinions 1 and 2 fast on an input shaft 3 are in constant mesh respectively with first and second speed gear wheels 4 and 5 co-axial with a lay-shaft 6, and a pinion 7 fast on the lay-shaft 6 is in constant mesh with an intermediate gear wheel 8 co-axial with the input shaft 3 and itself in constant mesh with a gear wheel 9 fast on an output shaft 10, a friction clutch 11 being provided to enable the intermediate gear wheel 8 on the input shaft 3 to be coupled to the engine or other driving shaft 12.

For convenience of description the left hand end of Figure 1 will be referred to as the front of the gear box and the right hand end as the rear of the gear box, and it will be assumed that the forward direction of rotation of the input shaft 3 is clockwise as viewed from the front of the gear box.

The second-speed wheel 5 is rigid with a hollow shaft 13 rotatable on the lay-shaft 6 with the interposition of a suitable bearing sleeve and has at its front end a forwardly opening drum 14 containing a ring of jaw-clutch teeth 15 projecting radially inwards. The first-speed wheel 4 has a hub 16 rotatable on the second-speed hollow shaft 13 again with the interposition of a suitable bearing sleeve and is rigid with a sleeve 17 projecting forwards around the said drum 14 and provided at its front end with a ring of jaw-clutch teeth 18 projecting radially inwards and spaced axially in front of the second-speed clutch teeth 15. The said drum 14 and sleeve 17 form two "first" members of a double synchronising coupling of the type hereinbefore specified. The common second member of this coupling is the lay-shaft 6 of the gearing, and on this lay-shaft 6 are formed right-handed helical splines 19 of steep pitch.

A common intermediate member is provided in the form of an internally-splined nut 20 engaged on the helical splines 19 on the shaft 6, said nut being provided with a circumferential flange 21 carrying jaw-clutch teeth 22 projecting radially outwards and capable of meshing alternatively with the rings of high- and low-speed clutch teeth 15 and 18. The axial spacing of these rings of teeth 15 and 18 (Figure 1) is such that the nut teeth 22 can occupy a transitional position between the two rings 15 and 18. On the front of the nut flange 21 is a set of four spring-loaded pawls 23 (Figure 2) two only of which are shown (in dotted lines) facing clockwise as viewed from the front of the gear box and each having its nose 24 slightly in advance of the counter-clockwise-facing flank 25 of the adjacent nut tooth (as viewed from the front of the gear box). On the back of the nut flange 21 is a set of four spring-loaded pawls 26 two only of which are shown (in full lines), facing counter-clockwise as viewed from the front of the gear box and each having its nose 27 projecting slightly beyond the clockwise-facing flank 28 of the adjacent nut tooth.

When the nut teeth 22 are engaged with the second-speed clutch teeth 15, forward driving torque tends to screw the nut 20 axially forwards on the splines 19 on lay-shaft 6 so as to disengage from the jaw-clutch teeth 15; this movement is normally prevented by a control sleeve 29 slidably splined to a front extension 30 of the nut 20 and having in its front end locking splines 31 engageable with dogs 32 rigid with the lay-shaft 6.

In order to change from the second- to the first-speed ratio, the control sleeve 29 is urged forwards by means of a yielding spring-loaded preselector link such as is shown at 33 in Figure 1; if there is a driving torque on the second-speed train, friction on the locking splines prevents the locking sleeve 29 from moving forwards until the torque load is momentarily relieved by reduction of the power input. Thereafter the input shaft 3 is accelerated, and the second-speed teeth 15 screw the nut 20 axially forwards on the helical splines 19 on the lay-shaft 6 until its teeth 22 disengage from the second-speed ring of teeth 15 and take the transitional position referred to above. The front and back sets of pawls 23 and 26 now ratchet over the first- and second-speed rings of clutch teeth 18 and 15 respectively while the nut 20 remains in the transitional position until the speed of the first-speed teeth 18 tends to exceed that of the nut 20, whereupon one of the pawls of the front set 23 engages a tooth of the first-speed ring of clutch teeth 18 so that the nut 20 is screwed axially forwards synchronously into engagement with the first-speed teeth 18. When the teeth 22 and 18 are fully in mesh, further movement of the nut 20 helically on the lay-shaft is prevented by an axial stop 34 on the shaft 6.

In order to change from the first- to the second-speed ratio, the control sleeve 29 is urged by the spring-loaded link 33 into the second-speed position, but is at first unable to attain this position since the locking splines on the control sleeve and the dogs on the lay-shaft are out of register with each other. The input shaft 3 is now retarded while the inertia of the load maintains the rotation of the output and lay-shafts 10 and 6. The low-speed teeth 18 consequently screw the nut 20 axially rearwards on the lay-shaft 6 until its teeth 22 are disengaged from the first speed clutch ring teeth 18. The two sets of pawls 23 and 26 now ratchet over the two rings of clutch teeth 15 and 18 while the nut 20 remains in the transitional position, until the speed of the second-speed ring of clutch teeth 15 tends to drop below that of the nut 20, whereupon one of the pawls of the rear set 26 engages a tooth of the second-speed ring of clutch 15 so that the nut 20 is screwed axially to the rear synchronously into engagement with the second-speed teeth 15. As soon as the teeth 22 and 15 are fully engaged, the control sleeve 29 snaps into its locking position and prevents disengagement of the teeth when driving torque is thereafter applied through the second-speed train.

For third or high gear the friction clutch 11 is engaged to couple the engine or other driving shaft 12 directly to the intermediate gear wheel 8 on the input shaft 3 to effect direct drive to the output shaft, and in these conditions the speed of the second-speed member 14 falls below that of the nut 20 and the nut 20 is moved rearwards on the lay-shaft 6 into a position in which the teeth 22 of the nut are at the rear of and disengaged from the second-speed clutch ring teeth 15 and the latter are in overrunning engagement with the pawls of the front set 23 on the nut 20.

The gearing as so far described is of known kind and operates in known manner. Now, if when this gearing is at rest with the control sleeve 29 placed in the unlocked position and with no load on the movable nut 20, e. g. when the gear box is being serviced, the input shaft 3 should be rotated slightly backwards, given that the output shaft 10 is restrained against rotation, e. g. by friction or by virtue of its connection with the wheels of the vehicle, the nut 20, if in the first-speed position, being unlocked will be screwed rearwards on the lay-shaft into the transitional position in which its teeth 22 lie between the first and second clutch teeth rings 15 and 18.

Again, if the gearing is at rest with the nut 20 placed in the unlocked position, and the input shaft is rotated slightly forwards, the nut 20 is screwed forwards into the transitional position.

Again, if the friction clutch 11 is engaged or is not fully disengaged and is therefore dragging, and with the nut 20 in the first-speed position, and the control sleeve 29 in the unlocked position, the input shaft is rotated slightly backwards, e. g. through backward movement of the vehicle acting through the engaged or dragging clutch 11 and the gear train, the nut 20 will be screwed rearwards into the transitional position.

Thus with the nut 20 in the transitional position the two sets of pawls 23 and 26 are in or near contact with the respective first- and second-speed clutch rings 22 and 15, and if the direction of rotation of the said clutch rings is reversed there may be established in the gearing what may be termed a closed torque circuit through the two gear trains by way of their clutch rings 18 and 15, the pawls 23 and 26 and the nut 20.

The present invention is directed to the avoidance of any undesirable loads on the pawls in the circumstances described by providing at a convenient point in the part of the closed torque circuit constituted by the gear trains and their associated clutch rings a torsionally resilient coupling device capable of yielding under the action of the closed circuit torque through an angle sufficient to enable the nut 20 to be screwed on the lay-shaft into an engaged position so that the pawls are shifted axially out of the paths of the jaw-clutch teeth 15 or 18 and thereby relieved of load.

One method of carrying out the invention is illustrated in Figures 3 and 4 of the accompanying drawings in which the torsional resilient coupling is placed between the ring of second-speed jaw-clutch teeth 15 and the drum 14 of a gear box of the kind shown in Figure 1.

The front end of the drum 14 is provided with a cylindrical counterbore 35 and on the peripheral wall of the counterbore 35 are formed a number, for example twelve, of widely and uniformly spaced axial splines 36.

The jaw-clutch teeth are formed on the inner periphery of an annulus 37 fitting within the counterbore 35 and having around its outer periphery the same number, e. g. twelve, uniformly spaced axial splines 38 of a size to be accommodated with rotational back-lash in the gaps between the splines 36 on the counterbore 35.

A flat annular cover plate 39 is fixed by screws 40 to the end of the drum 14 and retains the annulus 37 in the counterbore.

A number, for example three, of arcuate channels 41 are uniformly distributed around the plane annular face of the counterbore 35 in the drum 14 and a corresponding number of pins 42 fixed on the annulus 37 project into these channels 41.

The pins 42 are normally held at the clockwise ends of the channels 41 by helical springs 43 compressed between the pins 42 and the remote ends of the channels 41 and under these conditions the clockwise-facing flanks of the splines 38 on the toothed annulus 37 abut against the counter-clockwise-facing flanks of the splines 36 in the counterbore 35.

The toothed annulus 37 is thereby coupled to the drum 14 by a coupling which is positive under driving torque from the drum 14 to the toothed annulus and torsionally resilient under the above described circulating torque.

Figures 5 and 6 illustrate a construction in which the torsionally resilient coupling is placed between the input shaft 3 and the second speed pinion 2 of a gear box of the kind shown in Figure 1.

In this case the pinion 2 has a hub 44 rigid with the input shaft 3 and a toothed rim 45 drivably coupled through a torsionally resilient coupling to the hub 44.

The torsionally resilient coupling in this case is formed as follows:

The toothed rim 45 is counterbored at one side to provide an annular recess 46 surrounding the end of the hub 44 (Figure 5). On the internal surface of the toothed rim 45 are formed a number, for example six, of widely and uniformly spaced axial splines 47. On the outer surface of the hub 44 are formed a similar number of widely and uniformly spaced axial splines 48. The splines 48 are accommodated with rotational back-lash in the gaps between the splines 47 on the rim 45. At one end of the hub 44 are formed a number of radially outwardly extending lugs 49 projecting part way across the annular recess 46 at the end of the toothed rim 45, and at the same end of the hub 44 is fixed an annular member 50 having an axial extension 51 at its outer periphery extending across the annular recess in the rim 45 and fitting over the ends of the radially extending lugs 49. In this part 51 of the member 50 are formed a number, three in the case illustrated, of arcuate channels 52 uniformly distributed around the member 50, and a corresponding number of axially-directed pins 53 fixed in the rim 45 of the pinion project axially into the channels 52.

The pins 53 are normally held at the counter-clockwise ends of the channels 52 as viewed in Figure 6 by helical springs 54 compressed between the pins 53 and the ends of the channels 52 remote from the pins, and under these conditions the counter-clockwise facing flanks of the splines 48 on the hub 44 fast on the input shaft 3 are in driving engagement with the clockwise facing flanks of the splines 47 on the toothed rim 45.

The toothed rim 45, the teeth of which mesh with the second-speed wheel 5 of the gear box, is thus coupled with the hub 44 on the input shaft 3 by a coupling which is positive under driving torque from the input shaft 3 to the second-speed wheel 5 and torsionally resilient under the above described circulating torque.

In Figure 7 there is illustrated another embodiment of the invention in which the torsionally resilient coupling is arranged between the second-speed ring of clutch teeth 15 and the drum 14 forming the carrier of said clutch teeth 15.

In this construction the second-speed ring of clutch teeth 15 are formed on the inner periphery of a ring member 55.

The drive of the ring member 55 by the drum 14 is by the engagement of helical teeth 56 on the drum 14 with helical teeth 57 on the outer periphery of the ring member 55, in this case substantially without backlash, these teeth 56 and 57 being of opposite hand to the splines 19 for the intermediate member 26 on the lay-shaft 6.

The ring member 55 takes a normal position against an abutment 58 fixed to the drum 14, the abutment 58 being such as to be capable of withstanding the thrust due to the driving engagement between the helical teeth 56 on the drum 14 and 57 on the ring member 55.

A number of light compression springs 59, uniformly spaced about the rotational axis of the lay-shaft, extend between the drum 14 and the ring member 55 so as to urge the latter towards the abutment 58.

This arrangement under normal conditions provides a coupling giving positive forward driving torque.

When the condition of circulating torque occurs, as when a backward rotation is imparted to the input shaft causing backward rotation of the first-speed internally toothed clutch rings 22 and the second-speed internally toothed clutch ring, comprising in this case the ring member 55, the ring member 55 is subjected to a thrust in the direction against the springs 59, so that the springs are compressed and the ring member is moved rotationally relative to the drum 14 and axially away from the abutment 58. If the backward movement is sufficient, the movement imparted to the ring member 55 will continue until the engaged ring of clutch teeth 15 on the ring member 55 slide sideways out of engagement with the mating faces of the pawls 26, the ring member 55 taking a position such as that shown in dotted lines in Figure 7.

The intermediate member 20 is thus released to move helically along the lay-shaft to engage its teeth 21 with the teeth 18 of the first-speed clutch teeth ring 22 and as this occurs the ring member 55 is returned by the springs 59 to its normal position against the abutment 58 in readiness to resume its normal operation.

Only a small angular relative rotational movement is required between the ring member 55 and the drum 14 to effect complete disengagement of the teeth 15 on the ring member from the pawls 26 and a helix angle of about 30° for the teeth 56 and 57 has been found suitable.

I claim:

1. Synchronising coupling means having, in combination, at least two rotatable toothed first members, a second rotatable member, a toothed intermediate member, means constraining said intermediate member to move helically on said second member for driving engagement alternatively with said first members, two subsidiary ratchet drives for effecting driving engagement, without clashing, of said intermediate member with the respective first members, said intermediate member, when moving from engagement with either of said first members into engagement with the other of said toothed members, passing through a transitional range of positions in which both ratchet mechanisms are simultaneously engageable upon reversal of the normal direction of rotation of said first members, means for mounting the teeth on one of said first members so that they are capable of sufficient relative movement in the appropriate direction relative to said one first member to enable said intermediate member to screw along said second member from said transitional position at least as far as serves to disengage one of the said ratchet drives, and means for resiliently urging said teeth in the other direction relative to said first member, whereby to prevent unduly high torque being applied to said ratchet drives when the normal direction of rotation of said first members is reversed with said intermediate member in a transitional position.

2. Synchronising coupling means having, in combination, at least two rotatable toothed first members, a second rotatable member, a toothed intermediate member, means constraining said intermediate member to move helically on said second member for driving engagement alternatively with said first members, two subsidiary ratchet drives, engageable for effecting driving engagement, without clashing, of said intermediate member with the respective first members, said intermediate member, when moving from engagement with either of said first members into engagement with the other of said toothed members, passing through a transitional range of positions in which both ratchet mechanisms are simultaneously engageable upon reversal of the normal direction of rotation of said first members, coupling means between the teeth of one of said first members and said one first member to provide a positive drive to said teeth under the action of torque applied in the driving direction to said one of the first members, said coupling means permitting movement of said teeth relative to said one first member to enable said intermediate member to screw along said second member from said transitional position at least as far as serves to disengage one of the said ratchet mechanisms, resilient means opposing said relative movement between said teeth and said one of the first members, whereby to prevent unduly high torque being applied to said ratchet mechanisms when the normal direction of rotation of said first members is reversed with said intermediate member in a transitional position.

3. Synchronising coupling means having at least two rotatable toothed first members, a second rotatable member, a toothed intermediate member, means constraining said intermediate member to move helically on said second member for driving engagement alternatively with said first members, two subsidiary ratchet drives, which include the teeth on said first members, engageable for effecting driving engagement, without clashing, of said intermediate member with the respective first members, torsionally resilient coupling means between the teeth on one of said first members and the remainder of said first member, wherein said one first member comprises a drum formed with helical splines and a toothed annulus formed with helical splines which engage with said first mentioned splines, an abutment for limiting axial movement of said annulus in one axial direction relative to said drum, and resilient means urging said annulus in said direction.

4. Synchronising coupling means comprising at least two rotatable toothed first members, a second rotatable member, an intermediate toothed member, means constraining said intermediate member to move helically on said second member, subsidiary ratchet mechanisms engageable respectively for establishing power paths alternatively from said first members to said second member through said intermediate member, said intermediate member having a range of transitional positions in which both ratchet mechanisms are engageable simultaneously by said two rotatable first members on reversal of the normal driving direction of said first members, and a coupling in one of said power paths in the portion thereof between said rotatable toothed first member and said intermediate toothed member, said coupling comprising (a) means providing a positive drive via said path in the driving direction of said path and (b) a torsionally resilient connection in the non-driving direction at least to the extent that when the direction of rotation of said first members is reversed with said intermediate member in a transitional position said intermediate member is capable of screwing along said second member at least as far as serves to disengage one of the said ratchet mechanisms.

5. Synchronising coupling means as set forth in claim 1, wherein said coupling in one of the power paths in the portion thereof between said rotatable toothed first member and the intermediate toothed member is included in that one of said power paths which provides the higher speed ratio as between the associated first member and said second member.

6. Synchronising coupling means as set forth in claim 1, wherein one of said first members includes a pinion on a driving shaft, and said coupling in one of the power paths in the portion thereof between said rotatable toothed first member and the intermediate toothed member is disposed between said driving shaft and said pinion.

7. A synchronising coupling comprising, in combination, a driving member, a driven member, two power paths between said driving member and driven member of different forward ratios, a pair of gears with one gear of said pair in one of said power paths and the other gear of said pair in the other of said power paths, a toothed intermediate member, ratchet drives to move said toothed intermediate member into engagement alternatively with said gears and to couple the engaged gear with said driven member, said toothed intermediate member being movable from engagement with either of said gears of said pair into engagement with the other gear of said pair and passing through a transitional position in which both of said ratchet drives are engageable with the respective gears of said pair when the normal forward driving direction of said driving member is reversed, and torsionally resilient coupling means included in one of said power paths in the portion thereof between said driving member and said toothed intermediate member to prevent unduly high torque from being applied to said ratchet drives when the normal direction of rotation of said driving member is reversed with said intermediate member in said transitional position, said torsionally resilient coupling means including means providing a positive drive in the driving sense between the said driving member and said driven member through said toothed intermediate member.

8. The synchronising coupling as claimed in claim 7, in which the said torsionally resilient coupling means are included in the power path of the ratio yielding the higher speed.

9. The synchronising coupling as defined in claim 7, in which said driving member is a driven shaft, a pinion is mounted on said shaft and said torsionally resilient coupling means consists of a resilient coupling between said shaft and said pinion.

10. A synchronising coupling comprising, in combination, a driving shaft, two gears providing different speed ratios on said driving shaft, a torsionally resilient coupling between one of said gears and said driving shaft, said coupling being resilient in the non-driving sense and providing a positive drive in the driving sense, a pair of driven gears meshing with said gears on said driving shaft, a toothed intermediate member arranged to be moved alternatively into driving engagement with said driven gears, and ratchet drives for effecting driving engagement of said intermediate member with the respective driven gears, said intermediate member when moving from engagement with either of said driven gears into engagement with the other of said driven gears passing through a transitional position in which said ratchet drives are simultaneously engageable with said driven gears, and said torsionally resilient coupling between one of said driving gears and said driving shaft preventing unduly high torque from being applied to said ratchet drives when the normal direction of rotation of said driving shaft is reversed with said toothed intermediate member in said transitional position.

References Cited in the file of this patent

UNITED STATES PATENTS

| | | |
|---|---|---|
| Re. 22,761 | Wemp | May 28, 1946 |
| 1,758,106 | Gaylord | May 13, 1930 |
| 2,011,822 | Munschauer | Aug. 30, 1935 |
| 2,202,271 | Sinclair | May 28, 1940 |
| 2,246,774 | Adney | June 24, 1941 |
| 2,433,428 | Carnagua | Dec. 30, 1947 |
| 2,439,919 | Brecht | Apr. 20, 1948 |
| 2,443,597 | Carnagua | June 22, 1948 |
| 2,505,842 | Sinclair | May 2, 1950 |